J. G. HOPPER.
BRAKE MECHANISM FOR AUTOMOBILES.
APPLICATION FILED MAR. 3, 1909.

977,631.

Patented Dec. 6, 1910.

WITNESSES.
Arthur L. Slee
Wm. F. Booth

INVENTOR.
John G. Hopper
by R. A. Warren
his atty.

UNITED STATES PATENT OFFICE.

JOHN G. HOPPER, OF SAN FRANCISCO, CALIFORNIA.

BRAKE MECHANISM FOR AUTOMOBILES.

977,631. Specification of Letters Patent. Patented Dec. 6, 1910.

Application filed March 3, 1909. Serial No. 481,062.

*To all whom it may concern:*

Be it known that I, JOHN G. HOPPER, a citizen of the United States, residing in the city and county of San Francisco and State of California, have invented certain new and useful Improvements in Brake Mechanism for Automobiles, of which the following is a specification.

The hereinafter described invention relates to an improved brake mechanism for use in connection with automobiles generally, the object thereof being to eliminate the frictional wear or strains thrown onto the tires of an automobile by the slipping of the wheels on the brakes being quickly applied, and by so doing prolonging materially the life or usefulness of the tires on the rear wheels of the machine.

Ordinarily, the brakes employed are those known as "band brakes," which work against the hub of the rear wheels of the automobile, the applying of which acts directly onto the wheels, and, when applied on heavy grades, causes the wheels to slip as the speed of the machine is checked or held back descending such grades. The frictional strains thus transferred onto the rear wheels of the machine, wear or cut away the outer tires thereof.

The present invention aims to dispense with applying the braking strains directly onto the wheels and consequently the tires thereof, which is accomplished by providing means whereby the brake shoes are caused to act directly against the surface of the roadway over which the machine is traveling, and by so doing arresting or retarding the movement of the car without causing slippage of the wheels.

To comprehend the invention, reference should be had to the accompanying sheet of drawings, wherein—

Figure 1:
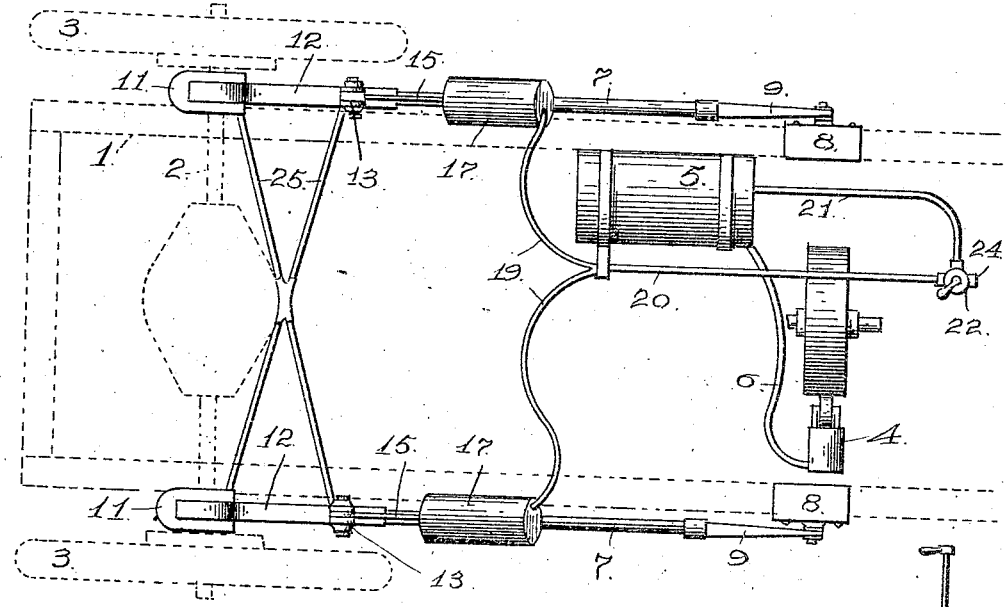
Figure 2:
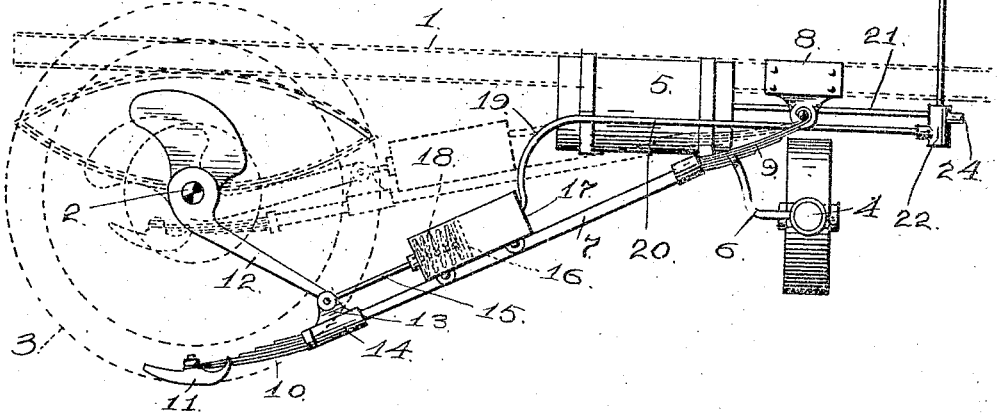

Figure 1 is a plan view of the frame of an ordinary automobile with the improved brake mechanism applied thereto. Fig. 2 is a side elevation of the frame, illustrating the brake shoes as applied to the surface of the roadway, the raised position of the brake mechanism being indicated by dotted lines.

In the drawings, the numeral 1 is used to designate the frame of the machine, 2 the rear axle carried thereby, and 3 the wheels mounted on the said axle. At any suitable point within the frame is located an air compressor 4, which is connected to the pressure or storage reservoir 5 located on the frame, by means of the connection 6.

To the frame of the machine the brake levers 7 are connected, the upper end of each lever being united to and suspended from a hanger 8, by means of the leaf spring joint 9. The purpose of interposing the said leaf spring between the upper end of each lever 7 and the hangers 8 to which they are connected, is that a certain flexibility may be permitted the said levers to allow of the same giving under certain strains placed thereon.

To the lower end of each lever 7 is attached a leaf spring 10, to which in turn is detachably united a brake shoe 11. The spring connection between the free end of the levers 7 and the shoes 11, allows of the shoes giving or adjusting themselves to inequalities in the surface of the roadway, the shocks incident to such changes during the application of the shoes to the surface of the roadway being absorbed by the leaf springs 9—10, which relieve the hinged brake levers 7 of the strains which otherwise would be placed thereon.

On the axle 2 are loosely mounted the depending links 12, the lower end of each link being pivoted between the ears 13 of the sleeves 14, secured to the brake levers 7. The links 12 turn freely on the axle 2, and to the pivoted point of each is connected the outer end of the piston rod 15, carrying a piston 16, which works within the piston cylinder 17. There is a cylinder 17 for each of the links 12, and the said cylinders are mounted on and carried by the brake levers 7.

Normally each piston 16 is held inwardly pressed within its cylinder 17 by means of a spring 18, interposed between the piston 16 and the outer head of the cylinder 17. As the pistons are forced inwardly within the cylinder 17, under the pressure of the springs 18, the piston rods 15 move therewith, which, acting against the pivoted point of the links 12, causes the links 12 to move upwardly, the same turning on the axle 2 and swinging the brake levers 7 therewith, the upward movement of which raises the brake shoes 11 clear of the surface of the roadway and places the brake levers and their associated parts into the position indicated by dotted lines in Fig. 2 of the drawings.

The piston cylinders 17 are connected with the pressure or storage reservoir 5 by means of the pipe connections 19, which branch from the lead pipe 20, connected to the valve controlled supply pipe 21. Within the supply pipe 21 is situated the three way valve 22, which valve is operated by the driver of the machine through the medium of the rotatable valve rod 23. When the valve 22 is turned to place its ports in registry with the lead pipe 20 and supply pipe 21, air under pressure escapes from within the reservoir 5 and is conveyed by the branch pipes 19 into the cylinders 17 back of the pistons 16, the pressure of which overcoming that of the springs 18 forces the pistons outwardly, and causes the links 12, through the medium of the connecting piston rods 15, to be thrown downwardly, which, swinging therewith the brake levers 7, places the brake shoes 11 against the surface of the roadway. The links 12 and the connected piston rods 15, may be said to act as toggles for controlling the positioning of the brake applying levers, which, when in tension, exert a severe braking strain onto the brake shoes. The movement for applying the brake shoes is under the control of the driver of the car, the same being regulated in accordance with the flow of air admitted from the storage reservoir into the piston cylinders.

To release the brake shoes, the valve rod or stem 23 is turned to cause the valve 22 to close the supply pipe 21, and open communication between the pipe 20 and the outlet 24, when, the air pressure being released, the pressure of the springs 18 is exerted against the pistons 16 and the same are forced inwardly, and, through the described connections, raising the brake levers 7 to clear the brake shoes of contact with the surface of the roadway.

To provide against the brake levers giving to lateral strains placed thereon, the same are united and held together by means of the tie rods 25.

By the use of the described brake mechanism, slippage of the wheels on the surface of the roadway is avoided, which relieves the outer casing of the tires of frictional wear thereon. Again, the pressure of the brake shoes onto the surface of the roadway may be so applied as to act to prevent the skidding of the automobile on slippery roadways.

To avoid the brake shoes cutting into the surface of the roadway and to move over obstructions therein, the ends thereof are slightly upwardly curved.

Having thus described the invention what is claimed as new and desired to be protected by Letters Patent is—

1. The combination with an automobile of a road brake mechanism comprising a brake lever hinged to the vehicle frame, a brake shoe carried thereby, means for raising and lowering the brake lever including a piston cylinder mounted on the lever and a piston working therein, a pressure reservoir mounted on the vehicle, a connection between the reservoir and the piston cylinder, and means for regulating the pressure from the reservoir to the piston cylinder for placing into action the piston therein.

2. The combination with an automobile of a roadway brake mechanism, the same comprising a brake lever hinged to the frame of the car, a brake shoe carried thereby, a sleeve mounted to slide on the brake lever, a link pivotally connected with a part of the vehicle frame and with said sleeve, a piston cylinder, an air pressure actuated piston working therein, a connection between the piston and said link, a pressure reservoir, connections between said reservoir and the piston cylinder, and means under the control of the operator of the automobile for regulating the pressure from the reservoir to the piston cylinder for placing into action the piston therein.

3. The combination with an automobile of a road brake mechanism comprising a brake lever hinged to the vehicle frame, a brake shoe carried thereby, means for raising and lowering the brake lever including a piston cylinder mounted on the lever and a piston working therein, a pressure reservoir mounted on the vehicle, a connection between the reservoir and the piston cylinder, a spring acting against the piston to normally hold the same pressed within the cylinder, and means for regulating the pressure from the reservoir to the piston cylinder for placing into action the piston therein.

4. The combination with an automobile of a road brake mechanism comprising a brake lever hinged to the vehicle frame, a brake shoe carried thereby, means for raising and lowering the brake lever including a piston cylinder mounted on the lever and a piston working therein, a pressure reservoir mounted on the vehicle, a flexible connection between the reservoir and the piston cylinder, and means for regulating the pressure from the reservoir to the piston cylinder for placing into action the piston therein.

5. The combination with an automobile of a roadway brake mechanism, the same comprising a plurality of brake levers hinged to the frame of the machine, link connections between said levers and the rear axle of the machine, a brake shoe carried by each lever, a piston cylinder mounted on each lever, a piston working in each cylinder, connections between the pistons and the links suspended from the rear axle of the machine, mechanism for supplying air under pressure to the said cylinder to actuate the pistons for lowering the brake levers to apply the brake shoes to the surface of the roadway, and means under the control of the operator of the car for controlling the supply of air to the said cylinders.

6. The combination with an automobile of a roadway brake mechanism comprising a brake lever hinged to the frame of the vehicle, a brake shoe carried thereby, a movable link connection between the brake lever and a part of the vehicle, a piston cylinder mounted on the lever, a piston working in the cylinder, means for imparting the movement of the piston to said link to raise and lower the same and the brake lever, a pressure reservoir mounted on the vehicle frame, a connection between the reservoir and the piston cylinder, and means for regulating the pressure from the reservoir to the piston cylinder for placing into action the piston therein.

7. The combination with an automobile, of a roadway brake mechanism including a brake lever hinged at one end to the vehicle frame, said lever having an intermediate rigid portion and resilient end portions, a brake shoe connected to the other end of the lever, and means for raising and lowering said lever.

In testimony whereof I have signed my name to this specification in the presence of two subscribing witnesses.

JOHN G. HOPPER.

Witnesses:
N. A. ACKER,
S. CONSTINE.